(12) United States Patent
Lim et al.

(10) Patent No.: US 8,358,715 B2
(45) Date of Patent: Jan. 22, 2013

(54) SYSTEM AND METHOD FOR QUASI-ORTHOGONAL SPACE-TIME BLOCK CODING

(75) Inventors: Kwang Jae Lim, Daejeon (KR); Soo Young Kim, Daejeon (KR); Jing Li, Inner Mongolia (CN); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1065 days.

(21) Appl. No.: 12/335,080

(22) Filed: Dec. 15, 2008

(65) Prior Publication Data
US 2010/0008439 A1 Jan. 14, 2010

(30) Foreign Application Priority Data
Jul. 10, 2008 (KR) .................. 10-2008-0066872

(51) Int. Cl.
*H04B 7/02* (2006.01)
(52) U.S. Cl. ........ 375/267; 375/260; 375/262; 375/340; 375/343; 375/347; 375/350
(58) Field of Classification Search .................. 375/267, 375/260, 262, 340, 343, 346, 350; 370/203, 370/204, 205, 208, 209, 210
See application file for complete search history.

(56) References Cited

U.S. PATENT DOCUMENTS
8,139,677 B2 * 3/2012 Mujtaba et al. ............... 375/299
2006/0056538 A1 3/2006 Nam et al.

FOREIGN PATENT DOCUMENTS
KR 10-2006-0050438 5/2006

OTHER PUBLICATIONS

Rafael bru, "Grammian matrices and balanced model of generalized systems"; Applied mathematics and computations, 2002.*
Bijana badic, "Qusasi-orthogonal space-time block codes: Approaching optimality"; Institute of communications and radio frequency engineering, Vienna University of technology, 2005.*
Biljana Badic, et al., "Quasi-Orthogonal Space-Time Block Codes on Measured MIMO Channels", IEEE 2004. SympoTIC'04, Bratislava, Slovakia, pp. 17-20, Oct. 24-26, 2004.
Chang-Hyeon Chae, et al., "Design of New Quasi-Orthogonal Space-Time Block Code with Minimum Decoding Complexity", The Journal of Korea Information and Communications Society (KICS), vol. 32, No. 12, pp. 1219-1225, Dec. 2007.
Jing Li, et al., "Computationally Efficient STBC Algorithm for a Full Rate Multi-antenna Scheme", Division of Electronics & Information Engineering, Chonbuk National University, Jeonju, Korea,; Jul. 14, 2008, pp. 1-6.
Hamid Jafarkhani, "A Quasi-Orthogonal Space-Time Block Code", IEEE Transactions on Communications, vol. 49, No. 1; Jan. 2001, pp. 1-4.

* cited by examiner

*Primary Examiner* — Dhaval Patel
(74) *Attorney, Agent, or Firm* — Kile Park Goekjian Reed & McManus PLLC

(57) ABSTRACT

The present invention relates to a quasi-orthogonal space-time block coding system and method. The system does not become particularly complicated since the encoding rate is given as 1 and it is possible to decode the encoded signal by using a simple linear algorithm, and system performance is increased since there is no interference component of an adjacent signal in the estimated signal.

9 Claims, 3 Drawing Sheets

SYSTEM AND METHOD FOR QUASI-ORTHOGONAL SPACE-TIME BLOCK CODING

CROSS-REFERENCE TO RELATED APPLICATION

This application claims priority to and the benefit of Korean Patent Application No. 10-2008-0066872 filed in the Korean Intellectual Property Office on Jul. 10, 2008, the entire contents of which are incorporated herein by reference.

BACKGROUND OF THE INVENTION (a) Field of the Invention

The present invention relates to a quasi-orthogonal space-time block coding system and method.

(b) Description of the Related Art

In a mobile communication system, a channel state is changed in various ways with respect to time because of fading and interference generated in the channel. In this condition, when the same signal is transmitted by a plurality of antennas of a transmitter, a receiver acquires a diversity gain by combining signals that are receiving from different channel environments, thereby improving system performance.

The space-time block coding (STBC) skill is to simultaneously encode the same information into different formats at a plurality of antennas, transmit them to the receiver, and thereby acquire the diversity gain. One of the most popular ways of the skill is to send two different encoding signals for the same information through two transmit antennas. In this skill, two symbols during two symbol period are encoded two different forms, and they are transmitted through two antennas. The encoding method used in this skill provides full orthogonality, and this allows a simple linear decoding at the receiver and the maximum diversity gains. An encoding rate of this skill is 1 because the number of symbols that are transmitted at respective antennas is one during a single symbol interval.

In general, in the transmission diversity method using a plurality of antennas, the diversity gain is increased as the number of antennas is increased. However, when the number of transmitting antennas is at least 3, the orthogonal STBC (O-STBC) method having the encoding rate of 1 cannot exist, and hence, it is required to use the method having an encoding rate that is less than 1 in order to acquire the sufficient diversity gain.

Therefore, the encoding rate of the O-STBC method using three or four transmitting antennas is given as 0.5 or 0.75. Reduction of the encoding rate results in a reduction in a signal data rate, hence reducing spectral efficiency.

In order to overcome the drawback, various quasi-orthogonal space-time block coding (QO-STBC) techniques having the encoding rate of 1 have been proposed. However, since the quasi-orthogonal space-time block coding methods do not maintain complete orthogonality, a decoding algorithm of the receiver becomes very complicated. Further, since the complete orthogonality is not maintained, interference of an adjacent signal exists when detecting a received signal, and the system performance is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a quasi-orthogonal space-time block coding system and method having the encoding rate of 1 and linearly performing a decoding process.

An exemplary embodiment of the present invention provides a method for finding an encoding matrix including: finding a first Grammian matrix of a first channel matrix for a first space time block encoding matrix including a plurality of transmission symbols to be transmitted through a plurality of antennas; finding a rotation matrix for the first Grammian matrix, and applying the same to the first Grammian matrix to generate a second Grammian matrix that is a diagonal matrix; and finding a second space time block encoding matrix for a second channel matrix generated by using the generated second Grammian matrix.

Another embodiment of the present invention provides a quasi-orthogonal space-time encoding system including: an encoder for encoding symbols to be transmitted by using an encoding matrix generated by a Grammian matrix that is a diagonal matrix, and outputting encoded signals to a plurality of transmitting antennas; and a decoder for receiving the encoded signals and linearly decoding the same.

According to the present invention, the complexity of the system is very low since the encoding rate is given as 1 and simultaneously the encoded signal can be decoded by using a simple linear decoding algorithm. Also, system performance is improved since there is no interference component of the adjacent signal.

DETAILED DESCRIPTION OF THE EMBODIMENTS

Figure 1:
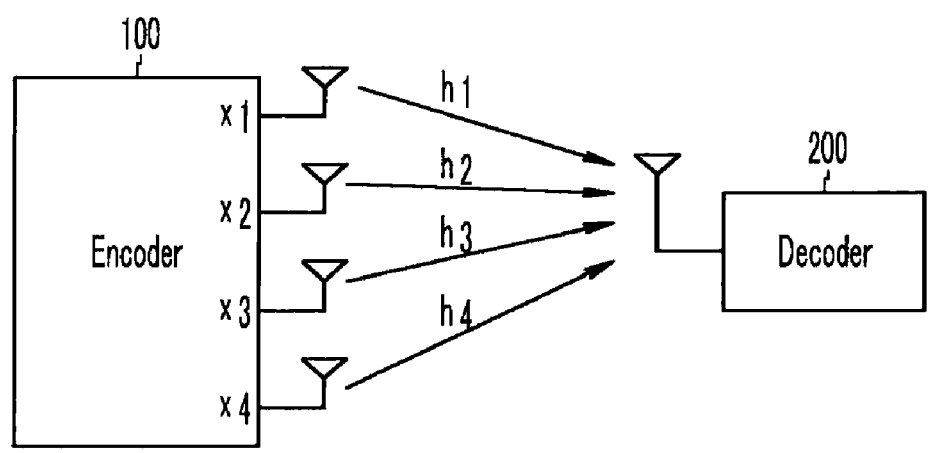
FIG. 1 shows a configuration diagram of a system for acquiring a transmission diversity gain by using a quasi-orthogonal space-time block coding method according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

A system having 4 transmitting antennas and 1 receiving antenna will be exemplified in an exemplary embodiment of the present invention, and the exemplary embodiment of the present invention is not restricted thereto. An exemplary embodiment of the present invention will now be described in detail with reference to accompanying drawings.

FIG. 1 shows a configuration diagram of a system for acquiring a transmission diversity gain by using a quasi-orthogonal space-time block coding method according to an exemplary embodiment of the present invention.

As shown in FIG. 1, the system includes a transmitter including an encoder 100 and a receiver including a decoder 200. Here, the transmitter has four antennas and the receiver has one antenna.

The encoder 100 encodes a signal in order for the transmitter to transmit the signal to the receiver. In the exemplary embodiment of the present invention, the method having an encoding rate of 1 for transmitting one symbol for each symbol period is used. The decoder 200 of the receiver linearly decodes the received encoded signal. For this, the encoder 100 of the transmitter encodes the signal through the quasi-orthogonal space-time block coding method having the encoding rate of 1, and a process for generating a matrix for the quasi-orthogonal space-time block encoding will be described with reference to FIG. 2.

In order to describe the generation process according to FIG. 2, an encoding matrix of the quasi-orthogonal space-time block encoding method having the encoding rate of 1 in the system having four general transmitting antennas will now be described. A general quasi-orthogonal space-time block encoding matrix $C_J$ can be expressed as Equation 1.

$$C_J = \begin{bmatrix} x_1 & x_2 & x_3 & x_4 \\ -x_2^* & x_1^* & -x_4^* & x_3^* \\ -x_3^* & -x_4^* & x_1^* & x_2^* \\ x_4 & -x_3 & -x_2 & x_1 \end{bmatrix} \quad \text{(Equation 1)}$$

Here, $x_1$, $x_2$, $x_3$, and $x_4$ represent symbols that are consecutively generated from the source for four symbol intervals, and the superscript * indicates a complex conjugate operation. Assuming that the channel state is constant over the four consecutive symbol intervals, i.e. flat fading, and considering the case of one receiving antenna, the signal received by the receiver for the four symbol intervals can be expressed as Equation 2.

$$r = [r_1 \ r_2 \ r_3 \ r_4]^T \quad \text{(Equation 2)}$$

$$= \begin{bmatrix} x_1 & x_2 & x_3 & x_4 \\ -x_2^* & x_1^* & -x_4^* & x_3^* \\ -x_3^* & -x_4^* & x_1^* & x_2^* \\ x_4 & -x_3 & -x_2 & x_1 \end{bmatrix} \begin{bmatrix} h_1 \\ h_2 \\ h_3 \\ h_4 \end{bmatrix} + \begin{bmatrix} n_1 \\ n_2 \\ n_3 \\ n_4 \end{bmatrix}$$

Here, $r = [r_1 r_2 r_3 r_4]^T$ represents signals that are sequentially received by the receiver for the four symbol intervals, $h_1$, $h_2$, $h_3$, and $h_4$ indicate fading channel values for the paths from the first to the fourth transmitting antennas to the receiving antenna, respectively, and $n_1$, $n_2$, $n_3$, and $n_4$ represent noise added on the four consecutive symbol intervals, respectively.

Equation 3 is acquired by taking complex conjugate operation to the second and third received symbols, $r_2$ and $r_3$, in Equation 2.

$$\tilde{r} = [r_1 \ r_2^* \ r_3^* \ r_4] \quad \text{(Equation 3)}$$

$$= \begin{bmatrix} h_1 & h_2 & h_3 & h_4 \\ h_2^* & -h_1^* & h_4^* & -h_3^* \\ h_3^* & h_4^* & -h_1^* & -h_2^* \\ h_4 & -h_3 & -h_2 & h_1 \end{bmatrix} \begin{bmatrix} x_1 \\ x_2 \\ x_3 \\ x_4 \end{bmatrix} + \begin{bmatrix} n_1 \\ n_2^* \\ n_3^* \\ n_4 \end{bmatrix}$$

When a linear decoding process is performed in order to acquire estimates for the signals $x_1$, $x_2$, $x_3$, and $x_4$ transmitted by the transmitter, the ideal estimates cannot be found due to interference from the neighboring signals. Due to this, a more complex decoding algorithm is generally used for a QO-STBC scheme. This can be explained when a decoding algorithm for O-STBC is applied to the exemplary embodiment of the present invention. That is, when the channel matrix is defined as Equation 4, the estimate for the signal transmitted by the transmitter can be found as expressed in Equation 5.

$$H = \begin{bmatrix} h_1 & h_2 & h_3 & h_4 \\ h_2^* & -h_1^* & h_4^* & -h_3^* \\ h_3^* & h_4^* & -h_1^* & -h_2^* \\ h_4 & -h_3 & -h_2 & h_1 \end{bmatrix} \quad \text{(Equation 4)}$$

$$\begin{bmatrix} \tilde{x}_1 \\ \tilde{x}_2 \\ \tilde{x}_3 \\ \tilde{x}_4 \end{bmatrix} = (H \cdot H^H)^{-1} \cdot H^H \cdot \tilde{r} \quad \text{(Equation 5)}$$

Here, when the system uses the orthogonal space-time block coding method, the Grammian matrix $\Delta = H^H \cdot H$ is always a diagonal matrix, and hence, no process or additional operation for finding a complicated inverse matrix is needed. However, considering the result of Equation 5, it is needed in the general quasi-orthogonal space-time block coding method to find the inverse matrix of the Grammian matrix and perform an additional matrix product, and the estimated signal has an interference signal component for another adjacent signal.

Therefore, in the exemplary embodiment of the present invention, the problem that the general quasi-orthogonal space-time block coding method has can be solved by transforming the Grammian matrix $\Delta = H^H \cdot H$ into a diagonal matrix.

Figure 2:
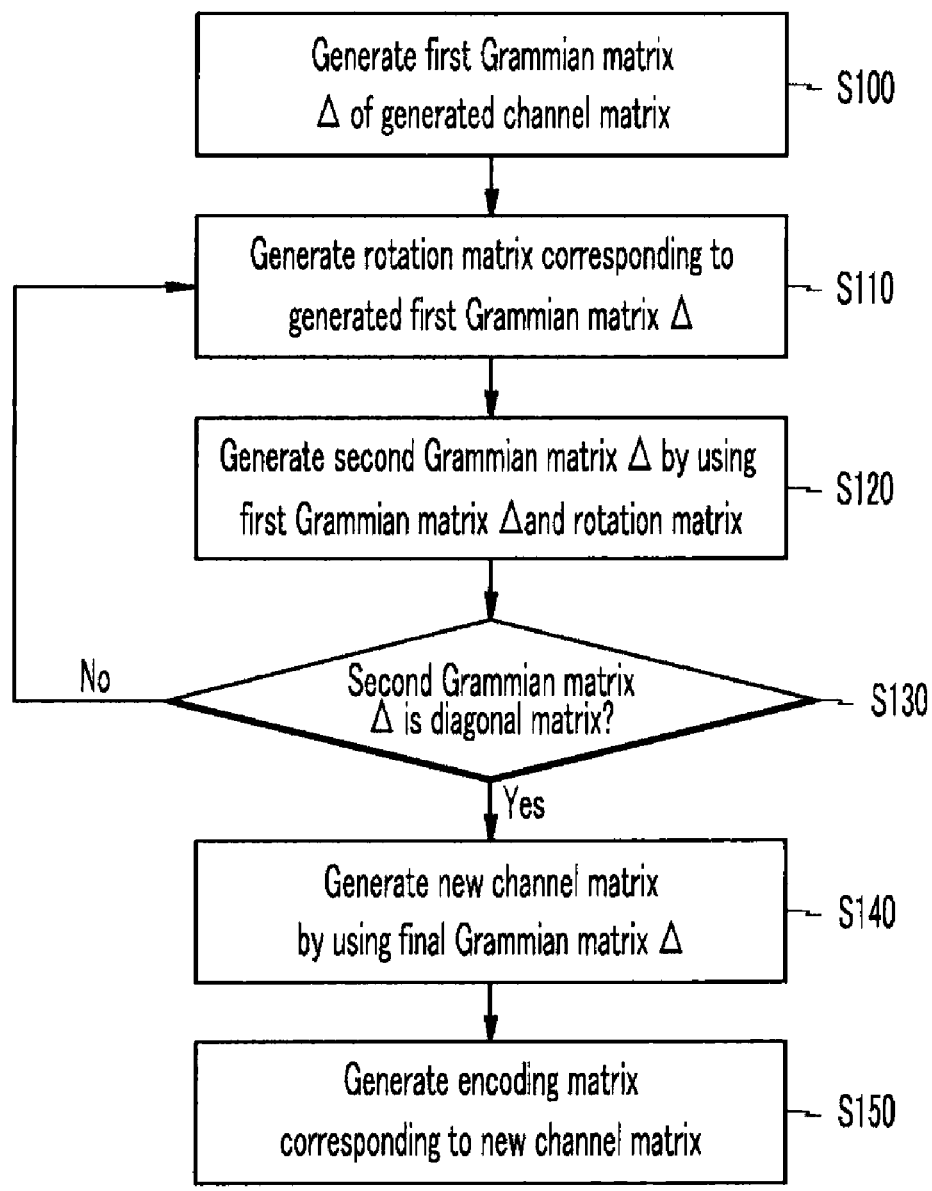
FIG. 2 shows a flowchart for using a quasi-orthogonal space-time block coding skill having an encoding rate of 1 according to an exemplary embodiment of the present invention.

FIG. 2 shows a flowchart for using a quasi-orthogonal space-time block coding skill having an encoding rate of 1 according to an exemplary embodiment of the present invention.

A Grammian matrix $\Delta = H^H \cdot H$ for the channel matrix of the general quasi-orthogonal space-time block encoding matrix in Equation 1 can be expressed as Equation 6 (S100).

$$H \cdot H^H = \Delta = \begin{bmatrix} \alpha & 0 & 0 & \beta \\ 0 & \alpha & \gamma & 0 \\ 0 & \gamma & \alpha & 0 \\ \beta & 0 & 0 & \alpha \end{bmatrix} \quad \text{(Equation 6)}$$

Here, $$\alpha = \sum_{i=1}^{4} h_i, \ \beta = 2\text{Re}[h_1^* h_4 - h_2 h_3^*], \ \gamma = 2\text{Re}[h_2 h_3^* - h_1^* h_4].$$

As shown in Equation 6, since the Grammian matrix $\Delta=H^H\cdot H$ is not a diagonal matrix, a Givens rotation matrix $G_1$ expressed in Equation 7 is found in order to eliminate a component other than the main diagonal component (S110). A case of eliminating β which is not the main diagonal component will be exemplarily described. Also, the method for generating the Givens rotation matrix will not be described in the exemplary embodiment of the present invention since it is well known to a person skilled in the art.

$$G_1 = \begin{bmatrix} \cos(\pi/4) & 0 & 0 & \sin(\pi/4) \\ 0 & 1 & 0 & 0 \\ 0 & 0 & 1 & 0 \\ -\sin(\pi/4) & 0 & 0 & \cos(\pi/4) \end{bmatrix} \quad \text{(Equation 7)}$$

A new Grammian matrix $\Delta_1$ found by applying the Givens rotation matrix G1 of Equation 7 to the Grammian matrix of Equation 6 and thus by eliminating β, can be expressed as Equation 8 (S120).

$$\Delta_1 = G_1^T \cdot \Delta \cdot G_1 = \begin{bmatrix} \alpha-\beta & 0 & 0 & 0 \\ 0 & \alpha & \gamma & 0 \\ 0 & \gamma & \alpha & 0 \\ 0 & 0 & 0 & \alpha+\beta \end{bmatrix} \quad \text{(Equation 8)}$$

When the new Grammian matrix $\Delta_1$ is generated as presented in Equation 8, the corresponding matrix is determined whether it is a diagonal matrix (S130). Here, the new Grammian matrix $\Delta_1$ is not yet the diagonal matrix. Therefore, the diagonal matrix of Equation 10 can be acquired by finding a Givens rotation matrix $G_2$ for eliminating γ other than the main diagonal component as shown Equation 9 and applying it to the new Grammian matrix $\Delta_1$.

$$G_2 = \begin{bmatrix} 1 & 0 & 0 & 0 \\ 0 & \cos(\pi/4) & \sin(\pi/4) & 0 \\ 0 & -\sin(\pi/4) & \cos(\pi/4) & 0 \\ 0 & 0 & 0 & 1 \end{bmatrix} \quad \text{(Equation 9)}$$

$$\Delta_2 = G_2^T \cdot \Delta_1 \cdot G_2 = \begin{bmatrix} \alpha-\beta & 0 & 0 & 0 \\ 0 & \alpha-\gamma & 0 & 0 \\ 0 & 0 & \alpha+\gamma & 0 \\ 0 & 0 & 0 & \alpha+\beta \end{bmatrix} \quad \text{(Equation 10)}$$

As expressed in Equation 10, since the final Grammian matrix $\Delta_2$ is a diagonal matrix, a new channel matrix $H_n$ can be found with $(H\cdot G_1 G_2)$ (S140). The new channel matrix $H_n$ can be expressed as Equation 11, and a corresponding encoding matrix $C_n$ can be given as Equation 12 (S150).

$$H_n = \quad \text{(Equation 11)}$$
$$H\cdot G_1 \cdot G_2 = \begin{bmatrix} h_1-h_4 & h_2-h_3 & h_2+h_3 & h_1+h_4 \\ h_2^*+h_3^* & -h_1^*-h_4^* & -h_1^*+h_4^* & h_2^*-h_3^* \\ h_2^*+h_3^* & h_1^*+h_4^* & -h_1^*+h_4^* & -h_2^*+h_3^* \\ -h_1^*+h_4^* & h_2^*-h_3^* & -h_2^*-h_3^* & h_1+h_4 \end{bmatrix}$$

$$C_s = \begin{bmatrix} x_1+x_4 & x_2+x_3 & -x_2+x_3 & -x_1+x_4 \\ -x_2^*-x_3^* & x_1^*+x_4^* & x_1^*-x_4^* & -x_2^*+x_3^* \\ x_2^*-x_3^* & x_1^*-x_4^* & x_1^*+x_4^* & x_2^*+x_3^* \\ -x_1+x_4 & x_2-x_3 & -x_2-x_3 & x_1+x_4 \end{bmatrix} \quad \text{(Equation 12)}$$

Since all the rows and columns, in the new channel matrix $H_n$ found from Equation 11, are orthogonal each other, the receiver can decode signals by using the Grammian matrix $H_n\cdot(H_n)^H$ for Equation 11. A system performance when the symbol is encoded according to an exemplary embodiment of the present invention will now be described with reference to FIG. 3.

Figure 3:
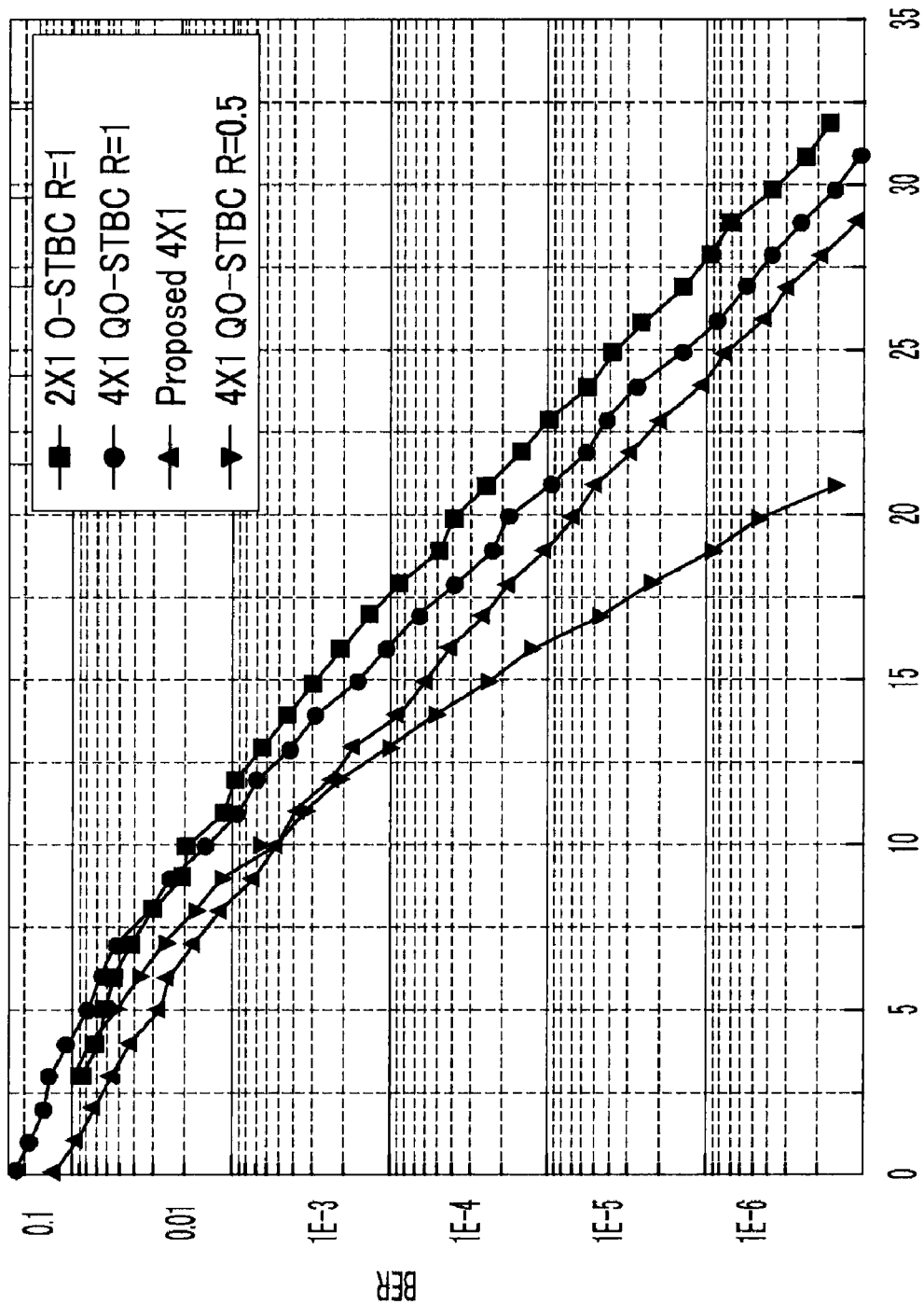
FIG. 3 shows performance of a quasi-orthogonal space-time block coding skill according to an exemplary embodiment of the present invention.

FIG. 3 shows performance of a quasi-orthogonal space-time block coding skill according to an exemplary embodiment of the present invention.

As shown in FIG. 3, the quasi-orthogonal space-time block coding skill having the encoding rate of 1 has a power gain of 2-3 dB compared to the existing quasi-orthogonal space-time encoding method. Further, the same skill generates better performance in the interval with a low signal-to-noise ratio (SNR) compared to the orthogonal space-time encoding method having the encoding rate of ½.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for finding an encoding matrix, comprising:
    finding a first Grammian matrix of a first channel matrix for a first space time block encoding matrix including a plurality of transmission symbols to be transmitted through a plurality of antennas;
    finding a rotation matrix for the first Grammian matrix, and applying the same to the first Grammian matrix to generate a second Grammian matrix that is a diagonal matrix; and
    finding a second space time block encoding matrix for a second channel matrix generated by using the generated second Grammian matrix.

2. The method of claim 1, wherein the method includes, when the generated second Grammian matrix is not a diagonal matrix,
    finding a rotation matrix for the second Grammian matrix, applying the same to the second Grammian matrix to repeat the process until the second Grammian matrix becomes a diagonal matrix.

3. The method of claim 1, wherein
    the first Grammian matrix is found through the first channel matrix and a Hermitian matrix of the first channel matrix.

4. The method of claim 1, wherein
    the second channel matrix is formed by a product of the first channel matrix and the rotation matrix.

5. A quasi-orthogonal space-time encoding system comprising:
- an encoder for encoding symbols to be transmitted by using an encoding matrix generated by a Grammian matrix that is a diagonal matrix, and outputting encoded signals to a plurality of transmitting antennas; and
- a decoder for receiving the encoded signals and linearly decoding the same,
- wherein the encoder is configured to generate the Grammian matrix by applying a rotation matrix to a first Grammian matrix of a first channel matrix for a first encoding matrix.

6. The quasi-orthogonal space-time encoding system of claim 5, wherein
the encoder encodes the symbols and transmits the encoded symbols by using the Grammian matrix of a channel matrix for a space time block encoding matrix configured by signals to be transmitted through the plurality of transmitting antennas.

7. The quasi-orthogonal space-time encoding system of claim 5, wherein
the linear decoding is to compute a channel value between the plurality of transmitting antennas and a receiving antenna, and to decode a transmission symbol from the received signal by using the Grammian matrix for the channel matrix formed from the found channel value.

8. The quasi-orthogonal space-time encoding system of claim 5, wherein the first Grammian matrix is not a diagonal matrix.

9. The method of claim 1, wherein the first Grammian matrix is not a diagonal matrix.

* * * * *